(12) United States Patent
Kaneko et al.

(10) Patent No.: US 9,593,002 B2
(45) Date of Patent: Mar. 14, 2017

(54) WORK VEHICLE, AND CONTROL METHOD FOR WORK VEHICLE

(71) Applicant: Komatsu Ltd., Tokyo (JP)

(72) Inventors: Shinji Kaneko, Oyama (JP); Yoshitaka Onodera, Hiratsuka (JP); Yoshifumi Shitara, Hiratsuka (JP); Taishi Oiwa, Naka-gun (JP); Jun Hashimoto, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 187 days.

(21) Appl. No.: 14/425,919

(22) PCT Filed: Sep. 19, 2014

(86) PCT No.: PCT/JP2014/074976
§ 371 (c)(1),
(2) Date: Mar. 4, 2015

(87) PCT Pub. No.: WO2015/186268
PCT Pub. Date: Dec. 10, 2015

(65) Prior Publication Data
US 2016/0257539 A1    Sep. 8, 2016

(51) Int. Cl.
*B66F 9/075*    (2006.01)
*B60K 17/10*    (2006.01)
(Continued)

(52) U.S. Cl.
CPC .......... *B66F 9/07572* (2013.01); *B60K 17/10* (2013.01); *B66F 9/22* (2013.01);
(Continued)

(58) Field of Classification Search
CPC .......... B66F 9/07572; B66F 9/22; B66F 9/07; B60K 17/10; F02D 11/105; F02D 41/021;
(Continued)

(56) References Cited

U.S. PATENT DOCUMENTS

2013/0089399 A1    4/2013    Kaneko et al.
2014/0290236 A1    10/2014   Aizawa et al.
(Continued)

FOREIGN PATENT DOCUMENTS

CN    102859155 A    1/2013
DE    102014101781 A1    10/2014
(Continued)

OTHER PUBLICATIONS

International Search Report and Written Opinion mailed Dec. 22, 2014, issued for PCT/JP2014/074976.
(Continued)

*Primary Examiner* — McDieunel Marc
*Assistant Examiner* — James E Stroud
(74) *Attorney, Agent, or Firm* — Locke Lord LLP (57) ABSTRACT

A work vehicle includes an accelerator operation amount generator receiving an actual accelerator operation amount of an accelerator operator to generate a control accelerator operation amount; an engine controller controlling the engine according to the control accelerator operation amount; and a storage storing a table in which an increasing speed for the control accelerator operation amount is set, wherein the accelerator operation amount generator obtains a difference between a converted accelerator operation amount of the accelerator operator converted from a rotating speed of the engine in a current control cycle and a control accelerator operation amount obtained in the last control cycle, determines an increasing speed of the control accelerator operation amount from the difference by referring to the table, and changes the control accelerator operation amount to an actual operation amount in the current control cycle with the determined increasing speed.

7 Claims, 6 Drawing Sheets

(51) Int. Cl.
*F02D 41/02* (2006.01)
*F02D 11/10* (2006.01)
*F16H 61/42* (2010.01)
*F16H 61/431* (2010.01)
*B66F 9/22* (2006.01)
*F02D 41/10* (2006.01)
F02D 29/04 (2006.01)
B66F 9/07 (2006.01)

(52) U.S. Cl.
CPC .......... *F02D 11/105* (2013.01); *F02D 41/021* (2013.01); *F02D 41/10* (2013.01); *F16H 61/42* (2013.01); *F16H 61/431* (2013.01); *B60Y 2200/15* (2013.01); *B66F 9/07* (2013.01); *F02D 29/04* (2013.01); *F02D 2200/501* (2013.01); *F02D 2200/602* (2013.01)

(58) Field of Classification Search
CPC ............... F02D 41/10; F02D 2200/501; F02D 2200/602; F16H 61/42; F16H 61/431; B60Y 2200/15
USPC .......................................................... 701/50
See application file for complete search history.

(56) References Cited

U.S. PATENT DOCUMENTS

| | | | |
|---|---|---|---|
| 2015/0183625 A1* | 7/2015 | Kaneko | B66F 9/22 701/50 |
| 2015/0232312 A1* | 8/2015 | Kaneko | B60K 6/00 701/50 |
| 2016/0024755 A1* | 1/2016 | Kobiki | F16H 61/02 477/52 |
| 2016/0082966 A1* | 3/2016 | Kaneko | B60W 30/188 701/84 |
| 2016/0084275 A1* | 3/2016 | Kaneko | B66F 9/07572 60/327 |
| 2016/0121900 A1* | 5/2016 | Yoshizawa | E02F 9/2246 701/50 |
| 2016/0257538 A1* | 9/2016 | Oiwa | F16H 61/438 |
| 2016/0257540 A1* | 9/2016 | Kaneko | B66F 9/20 |

FOREIGN PATENT DOCUMENTS

| | | |
|---|---|---|
| DE | 102014103932 B3 | 7/2015 |
| JP | 2004-009815 A | 1/2004 |
| JP | 2007-263012 A | 10/2007 |
| JP | 2009-209899 A | 9/2009 |
| JP | 2012-057502 A | 3/2012 |

OTHER PUBLICATIONS

Office Action dated Jul. 20, 2016, issued for German Patent Application No. 112014000167.8 and English translation thereof.

* cited by examiner

WORK VEHICLE, AND CONTROL METHOD FOR WORK VEHICLE

FIELD

The present invention relates to a work vehicle including a variable displacement hydraulic pump driven by an engine, and a hydraulic motor that forms a closed circuit with the hydraulic pump and is driven by operating oil discharged from the hydraulic pump, and a control method for a work vehicle.

BACKGROUND

There is a forklift including a hydraulic drive device called an HST (Hydro Static Transmission) mounted between an engine, which is a drive source, and drive wheels. In the HST, a traveling hydraulic pump of a variable displacement type driven by an engine and a hydraulic motor of a variable displacement type driven by operating oil discharged from the traveling hydraulic pump are provided to a main hydraulic circuit that is a closed circuit. The HST allows the vehicle to travel by transmitting driving force of the hydraulic motor to the drive wheels. Patent Literature 1 describes that, in a forklift including an HST, an engine is controlled according to a control accelerator operation amount, which is obtained by limiting an increase rate of an actual accelerator operation amount per hour to a limit value set beforehand.

CITATION LIST

Patent Literature

Patent Literature 1: Japanese Laid-open Patent Publication No. 2012-57502

SUMMARY

Technical Problem

For example, an operator may temporarily lift his/her foot off an accelerator pedal from the state in which he/she presses the accelerator pedal, and then, press the accelerator pedal again with a rotating speed of an engine being not 0. This operation takes time for a start-up of the control accelerator operation amount in the technique described in Patent Literature 1, with the result that it may take time to increase the rotating speed of the engine.

The present invention aims to suppress a delay in an increase in a rotating speed of an engine in response to an operation on an accelerator pedal upon controlling the engine in a forklift provided with an HST.

Solution to Problem

According to the present invention, a work vehicle including a working machine, the work vehicle comprises: an engine; a traveling hydraulic pump of a variable displacement type that is driven by the engine; a hydraulic motor that forms a closed circuit with the traveling hydraulic pump and that is driven by operating oil discharged from the traveling hydraulic pump; a drive wheel driven by the hydraulic motor to allow the work vehicle to travel; an accelerator operation unit that increases or decreases a supply amount of fuel to the engine; an accelerator operation amount generating unit that receives an actual accelerator operation amount of the accelerator operation unit to generate a control accelerator operation amount; an engine control unit that controls the engine according to the control accelerator operation amount; and a storage unit that stores an increasing speed determination table in which an increasing speed for the control accelerator operation amount is set, wherein the accelerator operation amount generating unit obtains a difference between a converted accelerator operation amount of the accelerator operation unit converted from a rotating speed of the engine in a current control cycle and a control accelerator operation amount obtained in a last control cycle, determines an increasing speed of the control accelerator operation amount from the obtained difference by referring to the increasing speed determination table, and changes the control accelerator operation amount to an actual operation amount in the current control cycle with the determined increasing speed.

In the present invention, it is preferable that the increasing speed determination table is set such that the increasing speed increases, as the difference increases.

In the present invention, it is preferable that the increasing speed determination table is set such that the different increasing speeds are set to different operation amounts of the accelerator operation unit.

In the present invention, it is preferable that the increasing speed increases, as the operation amount of the accelerator operation unit increases.

In the present invention, it is preferable that the work vehicle comprises: a brake operation unit used for stopping the work vehicle, wherein the increasing speed determination table includes a first increasing speed determination table used when the work vehicle is in a cargo handling state or in a traveling cargo-handling state, and a second increasing speed determination table used when the work vehicle is in a traveling state.

In the present invention, it is preferable that the work vehicle is a forklift.

According to the present invention, a control method for a work vehicle, the method controlling a work vehicle including a working machine; an engine; a traveling hydraulic pump of a variable displacement type that is driven by the engine; a hydraulic motor that forms a closed circuit with the traveling hydraulic pump and that is driven by operating oil discharged from the traveling hydraulic pump; a drive wheel driven by the hydraulic motor to allow the work vehicle to travel; an accelerator operation unit that increases or decreases a supply amount of fuel to the engine; an engine control unit that controls the engine according to the control accelerator operation amount; and a storage unit that stores an increasing speed determination table in which an increasing speed for the control accelerator operation amount is set, the method comprising: obtaining a difference between a converted accelerator operation amount of the accelerator operation unit converted from a rotating speed of the engine in a current control cycle and a control accelerator operation amount obtained in the last control cycle; determining an increasing speed of the control accelerator operation amount from the obtained difference by referring to the increasing speed determination table; and changing the control accelerator operation amount to an actual operation amount in the current control cycle with the determined increasing speed.

The present invention can suppress a delay in an increase in a rotating speed of an engine in response to an operation on an accelerator pedal upon controlling the engine in a forklift provided with an HST.

DESCRIPTION OF EMBODIMENTS

An Embodiment for embodying the present invention will be described below with reference to the drawings.

<Forklift>

Figure 1:
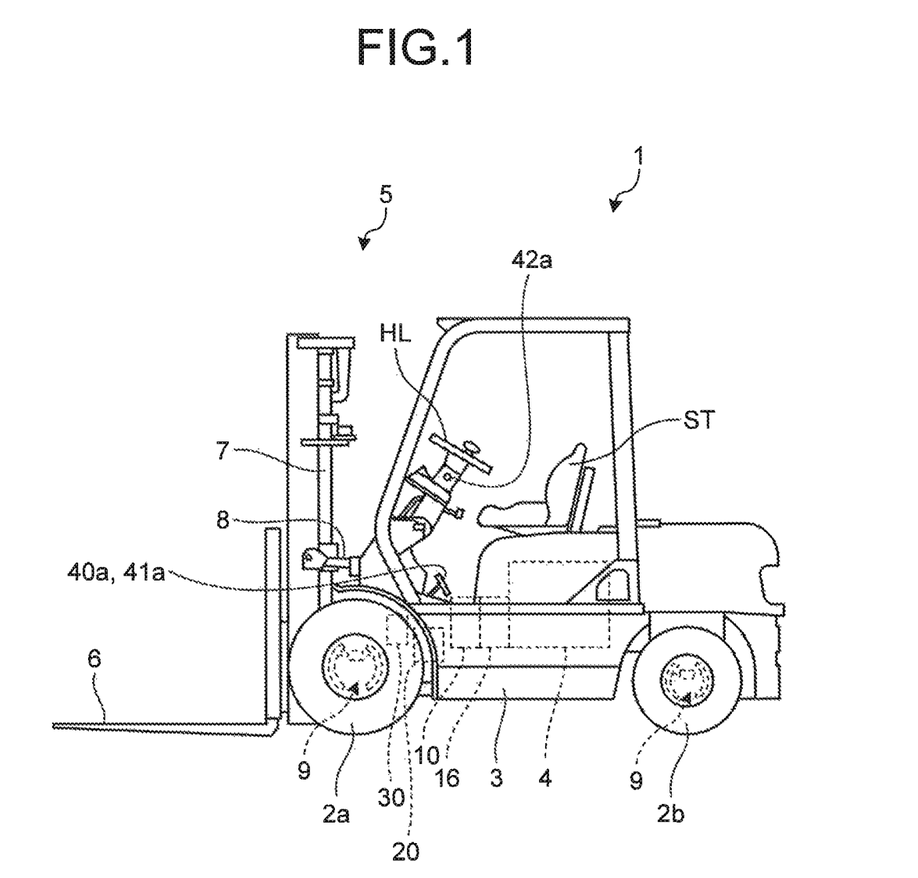
FIG. 1 is a view illustrating an entire configuration of a forklift according to an embodiment of the present invention.
Figure 2:
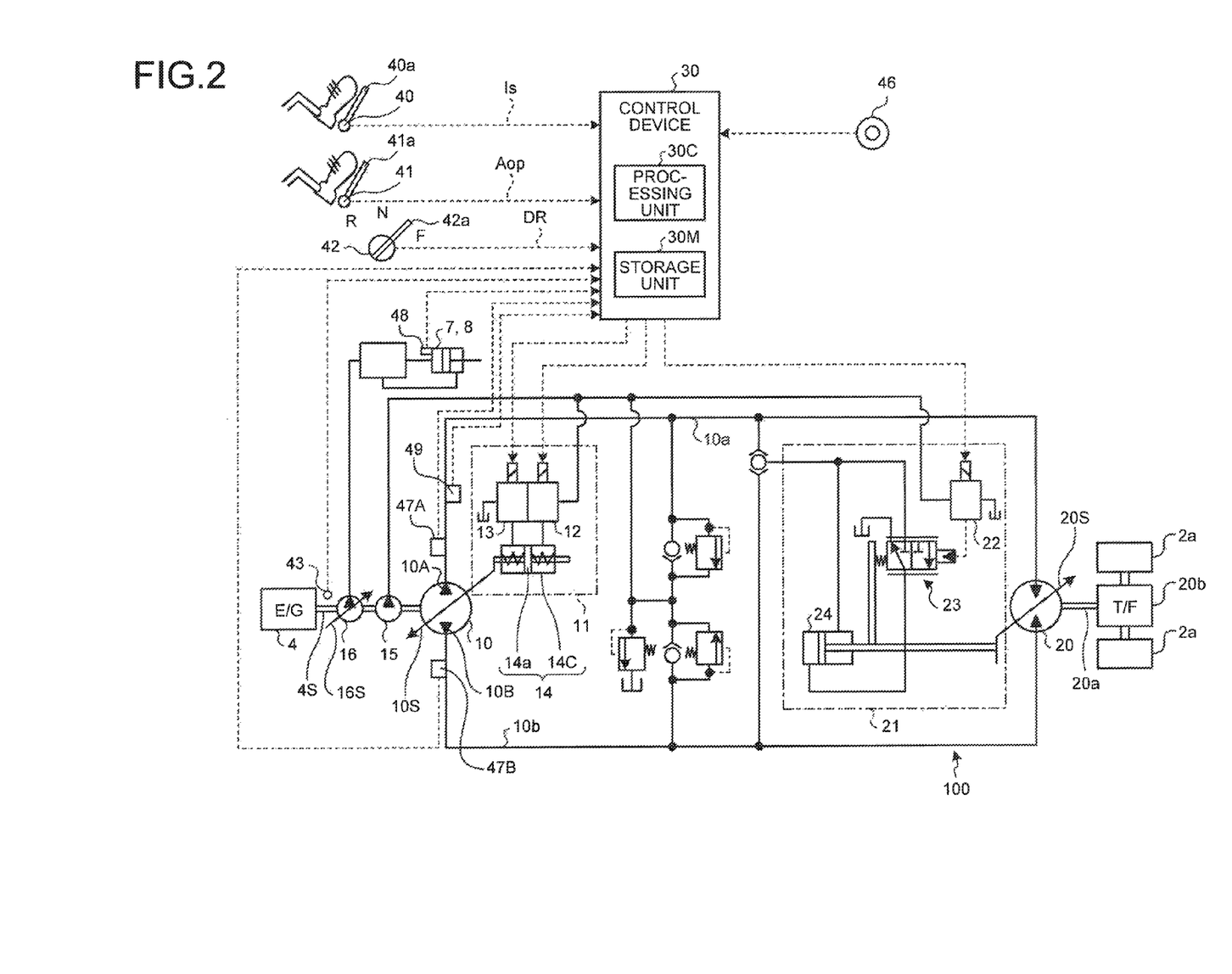
FIG. 2 is a block diagram illustrating a control system of the forklift illustrated in FIG. 1.

FIG. 1 is a view illustrating an entire configuration of a forklift 1 according to the present embodiment. FIG. 2 is a block diagram illustrating a control system of the forklift 1 illustrated in FIG. 1. The forklift 1 includes a body 3 having drive wheels 2a and steering wheels 2b; a working machine 5; and a mechanical brake 9 that stops the drive wheels 2a and the steering wheels 2b. In the forklift 1, the side from a driver's seat ST to a steering member HL is a front side, while the side from the steering member HL to the driver's seat ST is a back side. The working machine 5 is provided in front of the body 3.

An engine 4 that is one example of an internal combustion engine, a traveling hydraulic pump 10 of a variable displacement type, and a working machine hydraulic pump 16 are mounted on the body 3, the traveling hydraulic pump 10 and the working machine hydraulic pump 16 being driven by using the engine 4 as a drive source. The engine is a diesel engine, for example. However, the engine is not limited thereto. An output shaft 4S of the engine 4 is connected to the traveling hydraulic pump 10 and the working machine hydraulic pump 16. The traveling hydraulic pump 10 and the working machine hydraulic pump 16 are driven by the engine 4 via the output shaft 4S. The drive wheels 2a are driven by power from a hydraulic motor 20. The variable displacement traveling hydraulic pump 10 and a variable displacement hydraulic motor 20 communicate with each other by a closed hydraulic circuit to form an HST. In this way, the forklift 1 travels with the HST. In the present embodiment, the traveling hydraulic pump 10 and the working machine hydraulic pump 16 both have a swash plate 10S and a swash plate 16S. Their capacities are changed by changing tilt angles of the swash plates 10S and 16S.

The working machine 5 includes a lift cylinder 7 that moves a fork 6 up and down, and a tilt cylinder 8 that tilts the fork 6. A forward/reverse lever 42a, an inching pedal (brake pedal) 40a serving as a brake operation unit, an accelerator pedal 41a serving as an accelerator operation unit, and an unillustrated working machine operation lever including a lift lever and a tilt lever for operating the working machine 5 are provided on the driver's seat on the body 3. The inching pedal 40a changes an inching rate. The accelerator pedal 41a changes a supply amount of fuel to the engine 4. The inching pedal 40a and the accelerator pedal 41a are provided at a position where an operator of the forklift 1 can conduct a pedal operation from the driver's seat. FIG. 1 illustrates that the inching pedal 40a and the accelerator pedal 41a are overlapped with each other.

As illustrated in FIG. 2, the forklift 1 includes a main hydraulic circuit 100. The main hydraulic circuit is a closed circuit including the traveling hydraulic pump 10, the hydraulic motor 20, and hydraulic supply conduits 10a and 10b that connect the traveling hydraulic pump 10 and the hydraulic motor 20. The traveling hydraulic pump 10 is a device that is driven by the engine to discharge operating oil. In the present embodiment, the traveling hydraulic pump 10 is a variable displacement pump that can change its capacity by changing a tilt angle of a swash plate, for example.

The hydraulic motor 20 is rotated by the operating oil discharged from the traveling hydraulic pump 10. For example, the hydraulic motor 20 including a swash plate 20S is a variable displacement hydraulic motor that can change its capacity by changing a tilt angle of the swash plate. The hydraulic motor 20 may be a fixed displacement hydraulic motor. An output shaft 20a of the hydraulic motor 20 is connected to the drive wheels 2a via a transfer 20b. The hydraulic motor 20 rotates the drive wheels 2a via the transfer 20b to allow the forklift 1 to travel.

The hydraulic motor 20 can switch the rotating direction according to the supply direction of the operating oil from the traveling hydraulic pump 10. Since the rotating direction of the hydraulic motor 20 is switched, the forklift 1 travels in the forward direction or in the reverse direction. In the description below, it is supposed that the forklift 1 travels in the forward direction when the operating oil is supplied to the hydraulic motor 20 from the hydraulic supply conduit 10a, and the forklift 1 travels in the reverse direction when the operating oil is supplied to the hydraulic motor 20 from the hydraulic supply conduit 10b, for the sake of convenience.

In the traveling hydraulic pump 10, the portion connected to the hydraulic supply conduit 10a is an A port 10A, and the portion connected to the hydraulic supply conduit 10b is a B port 10B. Upon the movement of the forklift 1 in the forward direction, the operating oil is discharged from the A port 10A, and is flown into the B port 10B. Upon the movement of the forklift 1 in the reverse direction, the operating oil is flown into the A port 10A, and is discharged from the B port 10B.

The forklift 1 includes a pump capacity setting unit 11, a motor capacity setting unit 21, and a charge pump 15. The pump capacity setting unit 11 is provided in the traveling hydraulic pump 10. The pump capacity setting unit 11 includes a forward pump solenoid proportional control valve 12, a reverse pump solenoid proportional control valve 13, and a pump capacity control cylinder 14. The forward pump solenoid proportional control valve 12 and the reverse pump solenoid proportional control valve 13 in the pump capacity setting unit 11 receive an instruction signal from a later-described control device 30. In the pump capacity setting unit 11, the pump capacity control cylinder 14 operates according to the instruction signal supplied from the control device 30 to change the tilt angle of the swash plate of the traveling hydraulic pump 10, whereby the capacity of the traveling hydraulic pump 10 is changed.

The pump capacity control cylinder 14 has a piston 14a stored in a cylinder case 14C. The piston 14a reciprocates in the cylinder case 14C by the supply of the operating oil in a space between the cylinder case 14C and the piston 14a. In the pump capacity control cylinder 14, the piston 14a is held at a neutral position when the tilt angle of the swash plate is 0. Therefore, even when the engine 4 rotates, the amount of the operating oil discharged to the hydraulic supply conduit 10a or the hydraulic supply conduit 10b in the main hydraulic circuit from the traveling hydraulic pump 10 is 0.

It is supposed that an instruction signal to increase the capacity of the traveling hydraulic pump 10 is supplied to the forward pump solenoid proportional control valve 12 from the control device 30 from the state where the tilt angle of the swash plate of the traveling hydraulic pump 10 is 0, for example. In this case, the forward pump solenoid proportional control valve 12 applies a pump control pressure to the pump capacity control cylinder 14 according to this instruction signal. As a result, the piston 14a moves to the left in FIG. 2. When the piston 14a in the pump capacity control cylinder 14 moves to the left in FIG. 2, the swash plate 10S of the traveling hydraulic pump 10 tilts toward the direction of discharging the operating oil to the hydraulic supply conduit 10a in response to this motion.

As the pump control pressure from the forward pump solenoid proportional control valve 12 increases, the moving amount of the piston 14a increases. Therefore, the amount of change in the tilt angle of the swash plate 10S in the traveling hydraulic pump 10 also increases. Specifically, when the instruction signal is supplied to the forward pump solenoid proportional control valve 12 from the control device 30, the pump control pressure based on this instruction signal is applied to the pump capacity control cylinder 14 from the forward pump solenoid proportional control valve 12. When the pump capacity control cylinder 14 operates by the above pump control pressure, the swash plate 10S in the traveling hydraulic pump 10 tilts so as to be capable of discharging a predetermined amount of operating oil to the hydraulic supply conduit 10a. Thus, if the engine 4 rotates, the operating oil is discharged from the traveling hydraulic pump 10 to the hydraulic supply conduit 10a, whereby the hydraulic motor 20 rotates in the forward direction.

When an instruction signal to decrease the capacity of the traveling hydraulic pump 10 is supplied to the forward pump solenoid proportional control valve 12 from the control device 30 from the above-mentioned state, the pump control pressure applied to the pump capacity control cylinder 14 from the forward pump solenoid proportional control valve 12 decreases in response to this instruction signal. Therefore, the piston 14a in the pump capacity control cylinder 14 moves to the neutral position. As a result, the tilt angle of the swash plate in the traveling hydraulic pump 10 decreases, so that the discharging amount of the operating oil from the traveling hydraulic pump 10 to the hydraulic supply conduit 10a decreases.

When the control device 30 supplies an instruction signal to increase the capacity of the traveling hydraulic pump 10 to the reverse pump solenoid proportional control valve 13, the reverse pump solenoid proportional control valve 13 applies a pump control pressure to the pump capacity control cylinder 14 in response to this instruction signal. Therefore, the piston 14a moves to the right in FIG. 2. When the piston 14a in the pump capacity control cylinder 14 moves to the right in FIG. 2, the swash plate 10S of the traveling hydraulic pump 10 tilts toward the direction of discharging the operating oil to the hydraulic supply conduit 10b in response to this motion.

As the pump control pressure from the reverse pump solenoid proportional control valve 13 increases, the moving amount of the piston 14a increases. Therefore, the amount of change in the tilt angle of the swash plate in the traveling hydraulic pump 10 also increases. Specifically, when the instruction signal is supplied to the reverse pump solenoid proportional control valve 13 from the control device 30, the pump control pressure based on this instruction signal is applied to the pump capacity control cylinder 14 from the reverse pump solenoid proportional control valve 13. When the pump capacity control cylinder 14 operates by the above pump control pressure, the swash plate 10S in the traveling hydraulic pump 10 tilts so as to be capable of discharging a predetermined amount of operating oil to the hydraulic supply conduit 10b. Thus, if the engine 4 rotates, the operating oil is discharged from the traveling hydraulic pump 10 to the hydraulic supply conduit 10b, whereby the hydraulic motor 20 rotates in the reverse direction.

When an instruction signal to decrease the capacity of the traveling hydraulic pump 10 is supplied to the reverse pump solenoid proportional control valve 13 from the control device 30, the pump control pressure applied to the pump capacity control cylinder 14 from the reverse pump solenoid proportional control valve 13 decreases in response to this instruction signal. Therefore, the piston 14a moves to the neutral position. As a result, the tilt angle of the swash plate in the traveling hydraulic pump 10 decreases, so that the discharging amount of the operating oil from the traveling hydraulic pump 10 to the hydraulic supply conduit 10b decreases.

The motor capacity setting unit 21 is provided on the hydraulic motor 20. The motor capacity setting unit 21 includes a motor solenoid proportional control valve 22, a motor cylinder control valve 23, and a motor capacity control cylinder 24. When an instruction signal is supplied from the control device 30 to the motor solenoid proportional control valve 22 in the motor capacity setting unit 21, a motor control pressure is applied to the motor cylinder control valve 23 from the motor solenoid proportional control valve 22, whereby the motor capacity control cylinder 24 operates. When the motor capacity control cylinder 24 operates, the tilt angle of the swash plate in the hydraulic motor 20 is changed in response to the motion of the motor capacity control cylinder 24. Therefore, the capacity of the hydraulic motor 20 is changed in response to the instruction signal from the control device 30. Specifically, the tilt angle of the swash plate in the hydraulic motor 20 decreases, as the motor control pressure applied from the motor solenoid proportional control valve 22 in the motor capacity setting unit 21 increases.

The charge pump 15 is driven by the engine 4. The charge pump 15 applies the pump control pressure to the pump capacity control cylinder 14 via the forward pump solenoid proportional control valve 12 and the reverse pump solenoid proportional control valve 13. The charge pump 15 has a function of applying the motor control pressure to the motor cylinder control valve 23 via the motor solenoid proportional control valve 22.

In the present embodiment, the engine 4 drives the working machine hydraulic pump 16 as well as the traveling hydraulic pump 10. The working machine hydraulic pump 16 supplies operating oil to the lift cylinder 7 and the tilt cylinder 8, which are working actuators for driving the working machine 5.

The forklift 1 includes an inching potentiometer (brake potentiometer) 40, an accelerator potentiometer 41, a forward/reverse lever switch 42, an engine rotation sensor 43, a speed sensor 46, pressure sensors 47A and 47B, a pressure sensor 48, and a temperature sensor 49.

When the inching pedal (brake pedal) 40a is operated, the inching potentiometer 40 detects its operation amount and outputs the detected amount. The operation amount of the inching pedal 40a is an inching operation amount Is. The inching operation amount Is outputted from the inching potentiometer 40 is inputted to the control device 30. In the description below, the inching operation amount Is is sometimes referred to as an inching stroke Is.

When the accelerator pedal 41a is operated, the accelerator potentiometer 41 outputs an operation amount Aop of the accelerator pedal 41a. The operation amount Aop of the accelerator pedal 41a is also referred to as an accelerator operation amount Aop or an accelerator opening Aop. The accelerator opening Aop outputted from the accelerator potentiometer 41 is inputted to the control device 30.

The forward/reverse lever switch 42 is a selection switch for switching the advancing direction of the forklift 1 to a forward direction or a reverse direction. The present embodiment employs the forward/reverse lever switch 42 including a forward/reverse lever 42a provided at the position where a driver can conduct a selecting operation from the driver's seat. The driver operates the forward/reverse lever 42a to select any one of three directions, which are a forward direction, a neutral position, and a reverse direction, thereby being capable of switching the direction of the forklift 1 between the forward direction and the reverse direction. The forward/reverse lever 42a is an advancing direction switching device for switching the advancing direction of the forklift 1 to a forward direction or to a reverse direction. Information indicating the advancing direction of the forklift 1 selected by the forward/reverse lever switch 42 is supplied to the control device 30 from the forward/reverse lever switch 42 as an advancing direction instruction value DR. The advancing direction instruction value DR is set such that F indicates a forward direction, N indicates a neutral position, and R indicates a reverse direction. The advancing direction of the forklift 1 selected by the forward/reverse lever switch 42 includes both the direction in which the forklift 1 is to travel and the direction in which the forklift 1 is now traveling.

The engine rotation sensor 43 detects an actual rotating speed of the engine 4. The rotating speed of the engine 4 detected by the engine rotation sensor 43 is an actual rotating speed Nr of the engine 4. Information indicating the actual rotating speed Nr of the engine 4 is inputted to the control device 30. The rotating speed of the engine 4 is a rotating speed of the output shaft 4S of the engine 4 per a unit time. The speed sensor 46 is a device detecting a traveling speed of the forklift 1, i.e., an actual speed Vc.

The pressure sensor 47A is provided to the hydraulic supply conduit 10a to detect the pressure of the operating oil in the hydraulic supply conduit 10a. The pressure sensor 47B is provided to the hydraulic supply conduit 10b to detect the pressure of the operating oil in the hydraulic supply conduit 10b. The pressure detected by the pressure sensor 47A corresponds to the pressure of the operating oil in the A port 10A of the traveling hydraulic pump 10. The pressure detected by the pressure sensor 47B corresponds to the pressure of the operating oil in the B port 10B of the traveling hydraulic pump 10. The control device 30 acquires the detection values of the pressure sensors 47A and 47B, and uses the acquired values for a control method for a work vehicle according to the present embodiment. The pressure sensor 48 is a lift pressure detecting device that detects a lift pressure in the lift cylinder 7, i.e., the pressure of the operating oil in the lift cylinder 7. The temperature sensor 49 is a temperature detecting device that detects a temperature of the operating oil in the HST.

The control device 30 includes a processing unit 30C and a storage unit 30M. For example, the control device 30 is a device including a computer to execute various processes involved with the control of the forklift 1. The processing unit 30C is a device including a CPU (Central Processing Unit) and a memory in combination with each other. The processing unit 30C reads a computer program that is stored in the storage unit 30M for controlling the main hydraulic circuit 100, and executes a command written on this program to control the operation of the main hydraulic circuit 100. The storage unit 30M stores the above-mentioned computer program and data necessary for the control of the main hydraulic circuit 100. The storage unit 30M is a ROM (Read Only Memory), a storage device, or a device including a ROM and a storage device in combination.

Various sensors, such as the inching potentiometer 40, the accelerator potentiometer 41, the forward/reverse lever switch 42, the engine rotation sensor 43, the speed sensor 46, and the pressure sensors 47A and 47B, are electrically connected to the control device 30. The control device 30 generates instruction signals for the forward pump solenoid proportional control valve 12 and the reverse pump solenoid proportional control valve 13 based on the input signals from these various sensors, and supplies the generated instruction signals to the respective solenoid proportional control valves 12, 13, and 22.

<Control Block of Control Device 30>

Figure 3:
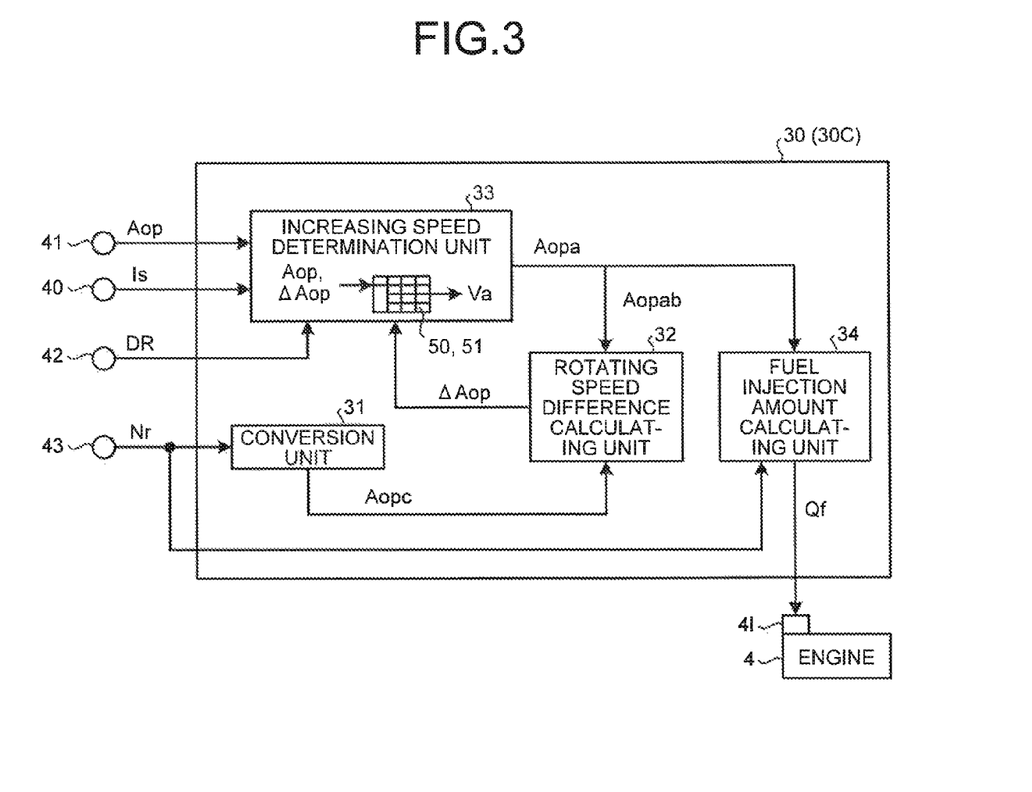
FIG. 3 is a control block diagram of a control device.

FIG. 3 is a control block diagram of the control device 30. The control device 30, more specifically, the processing unit 30C, executes the control method for a work vehicle according to the present embodiment, when the accelerator pedal 41a is operated. The processing unit 30C in the control device 30 includes a conversion unit 31, a rotating speed difference calculating unit 32, and an increasing speed determination unit 33. The control device executes the control method for a work vehicle according to the present embodiment in a predetermined control cycle to generate a control accelerator operation amount Aopa.

The conversion unit 31 acquires the rotating speed Nr of the engine 4 detected by the engine rotation sensor 43, and converts the obtained rotating speed Nr into an accelerator operation amount Aopc. The accelerator operation amount Aopc can be obtained from an equation (1). The accelerator operation amount Aopc is represented by a percentage, i.e., %. Ni in the equation (1) is a rotating speed of the engine 4 upon idling, and Nmax is the maximum value of the rotating speed of the engine 4. The equation (1) is stored in the storage unit 30M illustrated in FIG. 2. The conversion unit 31 supplies the rotating speed Nr of the engine 4 detected by the engine rotation sensor 43 to the equation (1) to obtain an accelerator operation amount Aopc, and outputs the obtained amount to the rotating speed difference calculating unit 32. In the description below, the accelerator operation amount Aopc is referred to as a converted accelerator operation amount Aopc as necessary.

$$Aopc=(Nr-Ni)/(Nmax-Ni)\times 100 \tag{1}$$

The rotating speed difference calculating unit 32 obtains a rotating speed difference ΔAop from the converted accelerator operation amount Aopc acquired from the conversion unit 31 and a control accelerator operation amount Aopab in the last control cycle out of the control accelerator operation amounts Aopa outputted from the increasing speed determination unit 33. The rotating speed difference ΔAop is a difference between the converted accelerator operation amount Aopc that is the operation amount on the accelerator pedal 41a converted from the rotating speed Nr of the engine 4 in the current control cycle and the control accelerator operation amount Aopab obtained in the last control cycle. The initial value of the control accelerator operation amount Aopab in the last control cycle is 0%. The rotating speed difference ΔAop can be obtained from an equation (2). The equation (2) is stored in the storage unit 30M illustrated in FIG. 2. The rotating speed difference calculating unit 32 supplies the converted accelerator operation amount Aopc and the control accelerator operation amount Aopab obtained in the last control cycle to the equation (2) to obtain the rotating speed difference ΔAop, and outputs the obtained difference to the rotating speed difference calculating unit 32.

$$\Delta Aop = Aopc - Aopab \quad (2)$$

The increasing speed determination unit 33 is an accelerator operation amount generating unit. The increasing speed determination unit 33 generates the control accelerator operation amount Aopa for controlling the engine 4 from the actual accelerator operation amount Aop on the accelerator pedal 41a. In this case, the increasing speed determination unit 33 determines an increasing speed Va from the rotating speed difference ΔAop, and a first increasing speed determination table 50 or a second increasing speed determination table 51 that is an increasing speed determination table. Specifically, the increasing speed determination unit 33 determines the increasing speed Va from the rotating speed difference Mop by referring to the first increasing speed determination table 50 or the second increasing speed determination table 51. The increasing speed determination unit 33 then changes the control accelerator operation amount Aopa in the current control cycle to the actual accelerator operation amount Aop in the current control cycle with the determined increasing speed Va. The increasing speed Va is an increasing amount of the control accelerator operation amount Aopa per a unit time. The increasing speed determination unit 33 increases the control accelerator operation amount Aopa up to the inputted actual accelerator operation amount Aop on the accelerator pedal 41a with the increasing speed Va. In the present embodiment, the increasing speed determination unit 33 acquires the actual accelerator operation amount Aop on the accelerator pedal 41a from the accelerator potentiometer 41. However, the actual accelerator operation amount Aop may be the one passing through a primary delay filter, or may the one obtained by limiting an upper limit value of the actual accelerator operation amount Aop, for example.

Figure 4:
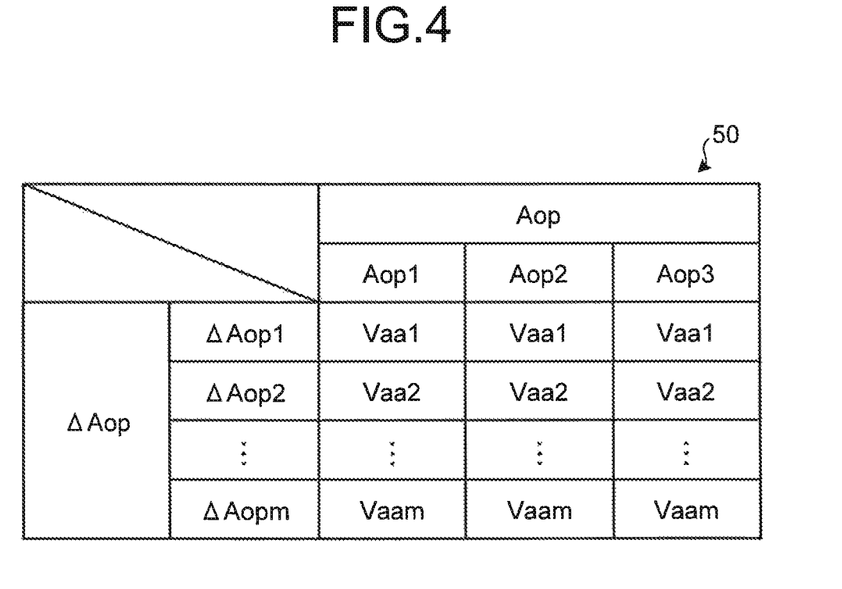
FIG. 4 is a diagram illustrating one example of an increasing speed determination table for determining an increasing speed.
Figure 5:
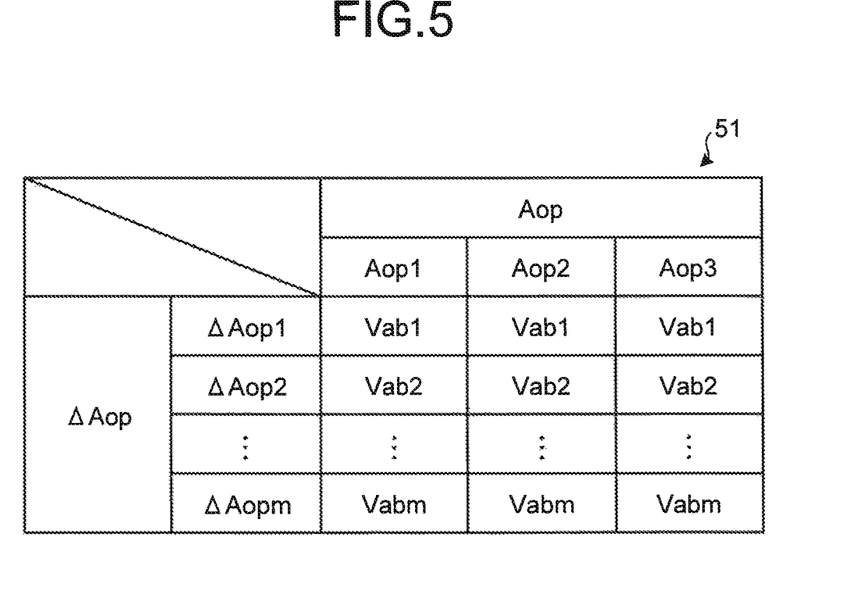
FIG. 5 is a diagram illustrating one example of an increasing speed determination table for determining an increasing speed.

FIGS. 4 and 5 are diagrams illustrating one example of the increasing speed determination table for determining the increasing speed Va. The first increasing speed determination table 50 and the second increasing speed determination table 51 are both stored in the storage unit 30M in the control device 30 illustrated in FIG. 2. In the first increasing speed determination table 50, plural increasing speeds Vaa1, Vaa2, . . . Vaam are set for each of the plural rotating speed differences ΔAop1, ΔAop2, . . . ΔAopm. In the second increasing speed determination table 51, plural increasing speeds Vab1, Vab2, . . . Vabm are set for each of the plural rotating speed differences ΔAop1, ΔAop2, . . . ΔAopm. m is an integer of 2 or more. If the plural rotating speed differences ΔAop1, ΔAop2, . . . ΔAopm are not distinguished, they are referred to as the rotating speed difference ΔAop. The plural increasing speeds Vaa1, Vaa2, . . . Vaam, and Vab1, Vab2, . . . Vabm are not distinguished, they are referred to as the increasing speed Vaa or the increasing speed Vab.

In the first increasing speed determination table 50, the increasing speeds Vaa1, Vaa2, . . . Vaam are set for each of the rotating speed differences ΔAop1, ΔAop2, . . . ΔAopm in this order. In the second increasing speed determination table 51, the increasing speeds Vab1, Vab2, . . . Vabm are set for each of the rotating speed differences ΔAop1, ΔAop2, . . . ΔAopm in this order.

The plural rotating speed differences ΔAop1, ΔAop2, . . . ΔAopm increase in this order. The increasing speed Va is set for each of the different accelerator operation amounts Aop1, Aop2, and Aop3. Aop1<Aop2<Aop3 is established. The increasing speed Va corresponding to the accelerator opening Aop other than the accelerator operation amounts Aop1, Aop2, and Aop3 is obtained by an interpolation using the increasing speed Va set for the accelerator operation amount Aop1 and the increasing speed Va set for the accelerator operation amount Aop2, or by an interpolation using the increasing speed Va set for the accelerator operation amount Aop2 and the increasing speed Va set for the accelerator operation amount Aop3. When the rotating speed difference ΔAop and the accelerator operation amount Aop in the current control cycle are supplied to the first increasing speed determination table or the second increasing speed determination table 51, the increasing speed Va corresponding to these values is selected. The magnitudes of the increasing speed Vaa and the increasing speed Vab are not limited, and they can appropriately be changed according to the specification of the forklift 1.

When the rotating speed difference ΔAop is less than 0, the first increasing speed determination table 50 and the second increasing speed determination table 51 set the increasing speed Vaa to have the same value to reduce a time lag for the operation on the accelerator pedal 41a. When the rotating speed difference ΔAop is equal to or greater than 0, the first increasing speed determination table 50 and the second increasing speed determination table 51 change the increasing speed Vaa for each of control accelerator operation amounts Aopab acquired in the last control cycle to change an accelerating feeling of the forklift 1. Specifically, when the rotating speed of the engine 4 is low, the forklift 1 is smoothly started with the decreased acceleration, and then, gradually increases the acceleration.

In the case where the actual accelerator operation amount Aop on the accelerator pedal 41a in the current control cycle increases, the increasing speed determination unit 33 supplies the rotating speed difference ΔAop and the accelerator operation amount Aop in the current control cycle to the first increasing speed determination table 50 or the second increasing speed determination table 51 to determine the increasing speed Va. Then, the increasing speed determination unit 33 changes the control accelerator operation amount Aopa in the current control cycle to the actual accelerator operation amount Aop in the current control cycle with the determined increasing speed Va.

In the first increasing speed determination table and the second increasing speed determination table 51, the increasing speed Va is set for each of the different accelerator operation amounts Aop1, Aop2, and Aop3. However, the increasing speed Va may be set for the rotating speed difference ΔAop, instead of the accelerator operation amount Aop. In this case, the increasing speed determination unit 33 supplies the rotating speed difference ΔAop to the first increasing speed determination table 50 or the second increasing speed determination table to determine the increasing speed Va.

In the case where the actual accelerator operation amount Aop on the accelerator pedal 41$a$ in the current control cycle is equal to or larger than the control accelerator operation amount Aopab acquired in the last control cycle, the increasing speed determination unit 33 determines that the actual accelerator operation amount Aop in the current control cycle is to increase. In the case where the actual accelerator operation amount Aop on the accelerator pedal 41$a$ in the current control cycle is less than the control accelerator operation amount Aopab acquired in the last control cycle, the increasing speed determination unit 33 determines that the actual accelerator operation amount Aop in the current control cycle is to decrease.

In the case where the actual accelerator operation amount Aop on the accelerator pedal 41$a$ in the current control cycle is to increase, the increasing speed determination unit 33 uses the first increasing speed determination table 50 or the second increasing speed determination table 51 depending on the case where the forklift 1 is in a cargo handling state or in a traveling and cargo-handling state, or the case where the forklift 1 is in a traveling state. Specifically, when the forklift 1 is in the cargo handling state or in the traveling and cargo-handling state, the first increasing speed determination table 50 is used, and when the forklift 1 is in the traveling state, the second increasing speed determination table 51 is used.

When comparing the first increasing speed determination table 50 and the second increasing speed determination table 51 with the same rotating speed difference $\Delta$Aop, the increasing speed Vaa in the first increasing speed determination table 50 is greater than the increasing speed Vab in the second increasing speed determination table 51. This setting can delay the rise in the rotating speed of the engine 4 to inhibit sudden acceleration upon the start of the forklift 1, as well as can suppress excessive acceleration of the forklift 1 to suppress fuel consumption, when the forklift 1 is in the traveling state. When the forklift 1 is in the cargo handling state or in the traveling and cargo-handling state, the rotating speed of the engine 4 can be quickly increased, since instantaneous force is needed for a cargo handling operation.

The increasing speed determination unit 33 acquires the detected values of the inching potentiometer 40 and the forward/reverse lever switch 42. When the inching stroke Is is equal to or larger than a predetermined value or when the forward/reverse lever 42$a$ is at the neutral position, the increasing speed determination unit 33 determines that the forklift 1 is in the cargo handling state or in the traveling and cargo-handling state. When the inching stroke Is is less than the predetermined value and the forward/reverse lever 42$a$ is at the forward position or reverse position, the increasing speed determination unit 33 determines that the forklift 1 is in the traveling state.

In the present embodiment, the processing unit 30C in the control device 30 includes a fuel injection amount calculating unit 34. The fuel injection amount calculating unit 34 serving as an engine control unit calculates an amount of fuel injected from a fuel injector in the engine 4 based on the control accelerator operation amount Aopa in the current control cycle obtained by the increasing speed determination unit 33 and the rotating speed Nr of the engine 4 detected by the engine rotation sensor 43. The fuel injection amount calculating unit 34 outputs an instruction value of a fuel injection amount Qf to the fuel injector 41. The fuel injector 41 injects fuel corresponding to the fuel injection amount Qf outputted from the fuel injection amount calculating unit to the engine 4.

In the present embodiment, the increasing speed Va of the control accelerator operation amount Aopa is limited to a sufficiently small value, and this can prevent the engine 4 from excessively revving up, even though the operator of the forklift 1 tries to apply the maximum acceleration to the forklift 1 by fully (100%) pressing the accelerator pedal 41$a$. This configuration can also reduce a sudden start of the forklift 1.

In the first increasing speed determination table 50, the increasing speed Vaa increases, as the rotating speed difference $\Delta$Aop increases. Since the rotating speed differences $\Delta$Aop1, $\Delta$Aop2, . . . $\Delta$Aopm increase in this order, the increasing speeds Vaa1, Vaa2, . . . Vaam also increase in this order. In the second increasing speed determination table 51, the increasing speed Vab increases, as the rotating speed difference $\Delta$Aop increases. Since the rotating speed differences $\Delta$Aop1, $\Delta$Aop2, . . . $\Delta$Aopm increase in this order, the increasing speeds Vab1, Vab2, . . . Vabm also increase in this order.

In the present embodiment, the increasing speeds Vaa and Vab increase, as the rotating speed difference $\Delta$Aop increases. Therefore, the increasing speed determination unit 33 can change the control accelerator operation amount Aopa to the actual accelerator operation amount Aop in the current control cycle in a short time, as the rotating speed difference $\Delta$Aop is larger. Accordingly, the control device 30 can shorten the time to obtain the control accelerator operation amount Aopa necessary for rising the rotating speed Nr of the engine 4, when the operator of the forklift 1 temporarily releases the accelerator pedal 41$a$ from the state of pressing the accelerator pedal 41$a$, and then, presses again the accelerator pedal 41$a$ with the rotating speed Nr of the engine 4 not being 0. Thus, the control device 30 can suppress the delay in the increase in the rotating speed Nr of the engine 4 in response to the pressing operation for the accelerator pedal 41$a$, thereby realizing a response of the engine 4 according to the intention of the operator on the forklift 1.

Figure 6:
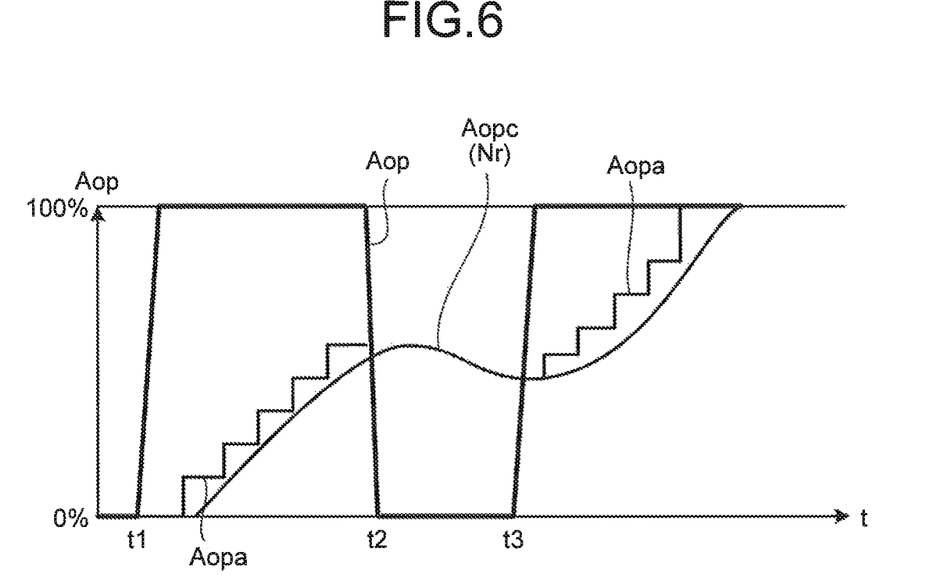
FIG. 6 is a diagram illustrating a relationship among an actual accelerator operation amount, a rotating speed of an engine, and a control accelerator operation amount.

FIG. 6 is a diagram illustrating a relationship among the actual accelerator operation amount Aop, the rotating speed Nr of the engine 4, and the control accelerator operation amount Aopa. In the example in FIG. 6, the operator of the forklift 1 presses the accelerator pedal 41$a$ at a time t1, and temporarily releases the accelerator pedal 41$a$ at a time t2. The control accelerator operation amount Aopa increases stepwise till the time t2 for each control cycle, and the rotating speed Nr of the engine 4 also increase till the time t2.

When the accelerator pedal 41$a$ is released at the time t2, the rotating speed Nr of the engine 4 decreases with a lapse of time, since the control accelerator operation amount Aopa is 0%. The rotating speed Nr of the engine 4 is not 0 at a time t3. The operator again presses the accelerator pedal 41$a$ at the time t3.

In the present embodiment, the increasing speed Va is determined by using the rotating speed difference $\Delta$Aop, which is the difference between the converted accelerator operation amount Aopc that is the operation amount of the accelerator pedal 41$a$ converted from the rotating speed Nr of the engine 4 in the current control cycle, and the control accelerator operation amount Aopab acquired in the last control cycle. The increasing speed Va increases, as the rotating speed difference $\Delta$Aop increases. Therefore, when the rotating speed difference $\Delta$Aop is larger, i.e., when the operator presses again the accelerator pedal 41a at the time t3, the control accelerator operation amount Aopa in the present embodiment increases with the large increasing speed Va. As a result, the time from when the accelerator pedal 41a is again pressed at the time t3 till the rotating speed Nr of the engine 4 starts to increase can be shortened.

In the first increasing speed determination table in the present embodiment, different increasing speeds Vaa may be set, or the same increasing speed Vaa or the same increasing speed Vab may be set, for different accelerator operation amounts Aop1, Aop2, and Aop3 with the same rotating speed difference ΔAop. Similarly, in the second increasing speed determination table 51, different increasing speeds Vab may be set, or the same increasing speed Vab may be set for different accelerator operation amounts Aop1, Aop2, and Aop3 with the same rotating speed difference ΔAop.

When different increasing speeds Vaa or the different increasing speeds Vab are set for the different accelerator operation amounts Aop1, Aop2, and Aop3, the increasing speeds Vaa or the increasing speeds Vab can be increased, as the accelerator operation amounts Aop1, Aop2, and Aop3 increase. The operator strongly presses the accelerator pedal 41a, when he/she intends to accelerate the forklift 1. If the increasing speed Vaa or the increasing speed Vab is set as described above, the increasing speed Vaa or the increasing speed Vab increases, as the accelerator pedal 41a is more strongly pressed. Therefore, the control device 30 can suppress the delay in the increase in the rotating speed Nr of the engine 4 in response to the pressing operation on the accelerator pedal 41a, thereby being capable of realizing a response of the engine 4 according to the intention of the operator on the forklift 1.

The present embodiment does not exclude a situation in which the increasing speed Vaa or the increasing speed Vab is decreased, as the accelerator operation amounts Aop1, Aop2, and Aop3 increase. Instead of the accelerator operation amounts Aop1, Aop2, and Aop3, the control accelerator operation amounts Aopab1, Aopab2, and Aopab in the last control cycle may be used.

<Modification>

Figure 7:
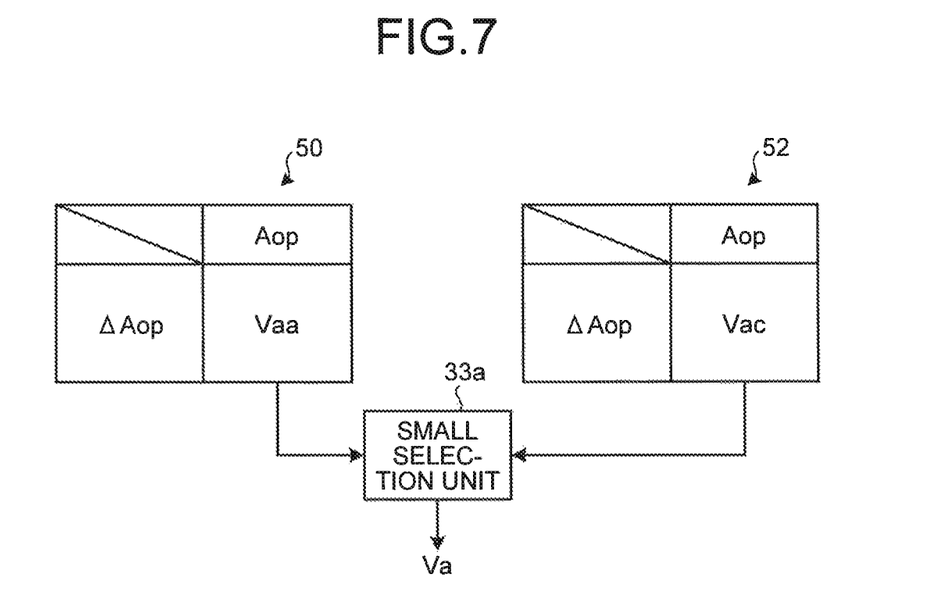
FIG. 7 is a diagram illustrating an example in which an increasing speed determination table for determining an increasing speed is prepared for each model of a forklift.
Figure 8:
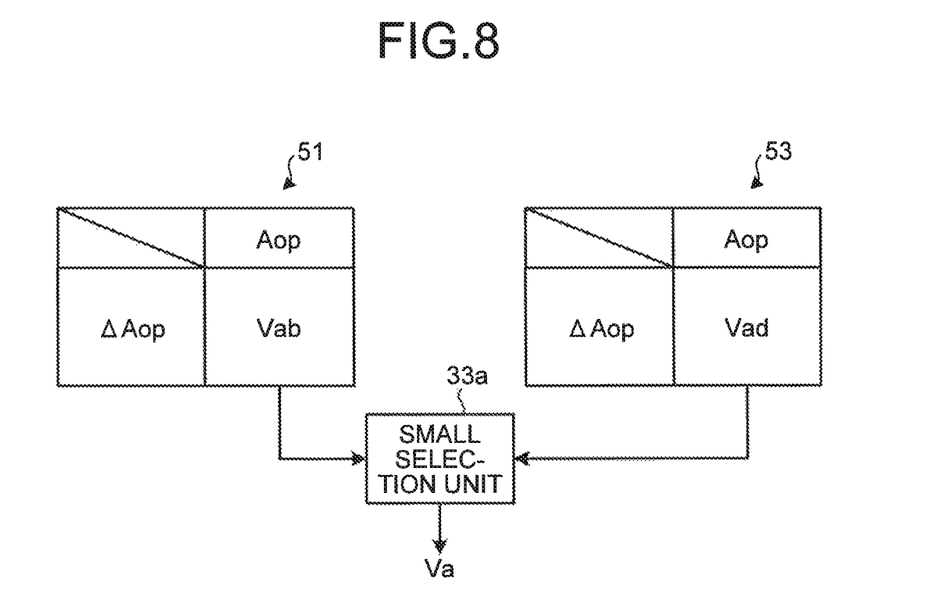
FIG. 8 is a diagram illustrating an example in which an increasing speed determination table for determining an increasing speed is prepared for each model of a forklift.

FIGS. 7 and 8 are diagrams illustrating an example in which a table for determining the increasing speed Va is prepared for each model of the forklift 1. It is supposed that a first increasing speed determination table 50 and a second increasing speed determination table 51 are used for a model A of the forklift 1, and a first increasing speed determination table 52 and a second increasing speed determination table 53 are used for a model B. The first increasing speed determination tables 50 and 52 are used when the forklift 1 is in the cargo handling state or in the traveling cargo-handling state, while the second increasing speed determination tables 51 and 53 are used when the forklift 1 is in the traveling cargo-handling state. An increasing speed Vaa is set in the first increasing speed determination table 50, an increasing speed Vab is set in the second increasing speed determination table 51, an increasing speed Vac is set in the first increasing speed determination table 52, and an increasing speed Vad is set in the second increasing speed determination table 53.

The increasing speed determination unit 33 illustrated in FIG. 3 includes a small selection unit 33a illustrated in FIGS. 7 and 8. In the present modification, the increasing speed determination unit 33 selects the smaller one of the increasing speed Vaa obtained from the first increasing speed determination table 50 and the increasing speed Vab obtained from the first increasing speed determination table 52 by the small selection unit 33a. The increasing speed determination unit 33 also selects the smaller one of the increasing speed Vac obtained from the second increasing speed determination table 51 and the increasing speed Vad obtained from the second increasing speed determination table 53 by the small selection unit 33a. Thus, the same control logic can be used between the different models A and B.

Control Example

Upon controlling the forklift 1, specifically, the engine 4, the rotating speed difference calculating unit 32 in the control device 30 obtains the rotating speed difference ΔAop. The increasing speed determination unit then determines the increasing speed Vaa or the increasing speed Vab from the obtained rotating speed difference ΔAop and the first increasing speed determination table 50 or the second increasing speed determination table 51. The increasing speed determination unit 33 then changes the control accelerator operation amount Aopa in the current control cycle to the actual accelerator operation amount Aop in the current control cycle with the determined increasing speed Vaa or the increasing speed Vab. The fuel injection amount calculating unit 34 determines the fuel injection amount Qf by using the control accelerator operation amount Aopa in the current control cycle. The fuel injector 41 in the engine 4 injects fuel in the determined fuel injection amount Qf to the engine 4.

While a certain embodiment have been described, the above description is not intended to limit the scope of the present embodiment. The components described above include those easily considered by a person skilled in the art, those substantially the same, and their equivalents. The above components can appropriately be combined. Furthermore, various omissions, substitutions, or modifications may be made without departing from the spirit of the present embodiment. The work vehicle is not limited to the forklift 1, so long as it is a work vehicle having wheels. For example, the work vehicle may be a wheel loader.

REFERENCE SIGNS LIST

1 FORKLIFT
3 BODY
4 ENGINE
4I FUEL INJECTOR
5 WORKING MACHINE
6 FORK
10 TRAVELING HYDRAULIC PUMP
11 PUMP CAPACITY SETTING UNIT
14 PUMP CAPACITY CONTROL CYLINDER
15 CHARGE PUMP
16 WORKING MACHINE HYDRAULIC PUMP
20 HYDRAULIC MOTOR
21 MOTOR CAPACITY SETTING UNIT
30 CONTROL DEVICE
30C PROCESSING UNIT
30M STORAGE UNIT
31 CONVERSION UNIT
32 ROTATING SPEED DIFFERENCE CALCULATING UNIT
33 INCREASING SPEED DETERMINATION UNIT
33a SMALL SELECTION UNIT
34 FUEL INJECTION AMOUNT CALCULATING UNIT
40 INCHING POTENTIOMETER
40a INCHING PEDAL

41 ACCELERATOR POTENTIOMETER
41a ACCELERATOR PEDAL
42 FORWARD/REVERSE LEVER SWITCH
42a FORWARD/REVERSE LEVER
43 ENGINE ROTATION SENSOR
46 SPEED SENSOR
50, 52 FIRST INCREASING SPEED DETERMINATION TABLE
51, 53 SECOND INCREASING SPEED DETERMINATION TABLE
100 MAIN HYDRUALIC CIRCUIT
Aop ACCELERATOR OPERATION AMOUNT (ACCELERATOR OPENING)
Aopa CONTROL ACCELERATOR OPERATION AMOUNT
Aopab, Aopab1, Aopab2, Aopab3 CONTROL ACCELERATOR OPERATION AMOUNT OBTAINED IN LAST CONTROL CYCLE
Aopc ACCELERATOR OPERATION AMOUNT (CONVERTED ACCELERATOR OPERATION AMOUNT)
DR ADVANCING DIRECTION INSTRUCTION VALUE
Is INCHING OPERATION AMOUNT (INCHING STROKE)
Nr ROTATING SPEED
Va, Vaa, Vab, Vac, Vad INCREASING SPEED
Vc SPEED
ΔAop ROTATING SPEED DIFFERENCE

The invention claimed is:

1. A work vehicle including a working machine, the work vehicle comprising:
an engine;
a traveling hydraulic pump of a variable displacement type that is driven by the engine;
a hydraulic motor that forms a closed circuit with the traveling hydraulic pump and that is driven by operating oil discharged from the traveling hydraulic pump;
a drive wheel driven by the hydraulic motor to allow the work vehicle to travel;
an accelerator operation unit that increases or decreases a supply amount of fuel to the engine;
an accelerator operation amount generating unit that receives an actual accelerator operation amount of the accelerator operation unit to generate a control accelerator operation amount;
an engine control unit that controls the engine according to the control accelerator operation amount; and
a storage unit that stores an increasing speed determination table in which an increasing speed for the control accelerator operation amount is set, wherein
the accelerator operation amount generating unit obtains a difference between a converted accelerator operation amount of the accelerator operation unit converted from a rotating speed of the engine in a current control cycle and a control accelerator operation amount obtained in a last control cycle, determines an increasing speed of the control accelerator operation amount from the obtained difference by referring to the increasing speed determination table, and changes the control accelerator operation amount to an actual operation amount in the current control cycle with the determined increasing speed.

2. The work vehicle according to claim 1, wherein the increasing speed determination table is set such that the increasing speed increases, as the difference increases.

3. The work vehicle according to claim 1, wherein the increasing speed determination table is set such that the different increasing speeds are set to different operation amounts of the accelerator operation unit.

4. The work vehicle according to claim 3, wherein the increasing speed increases, as the operation amount of the accelerator operation unit increases.

5. The work vehicle according to claim 1, comprising:
a brake operation unit used for stopping the work vehicle, wherein
the increasing speed determination table includes a first increasing speed determination table used when the work vehicle is in a cargo handling state or in a traveling cargo-handling state, and a second increasing speed determination table used when the work vehicle is in a traveling state.

6. The work vehicle according to claim 1, wherein the work vehicle is a forklift.

7. A control method for a work vehicle, the method controlling a work vehicle including a working machine; an engine; a traveling hydraulic pump of a variable displacement type that is driven by the engine; a hydraulic motor that forms a closed circuit with the traveling hydraulic pump and that is driven by operating oil discharged from the traveling hydraulic pump; a drive wheel driven by the hydraulic motor to allow the work vehicle to travel; an accelerator operation unit that increases or decreases a supply amount of fuel to the engine; an engine control unit that controls the engine according to the control accelerator operation amount; and a storage unit that stores an increasing speed determination table in which an increasing speed for the control accelerator operation amount is set, the method comprising:
obtaining a difference between a converted accelerator operation amount of the accelerator operation unit converted from a rotating speed of the engine in a current control cycle and a control accelerator operation amount obtained in the last control cycle;
determining an increasing speed of the control accelerator operation amount from the obtained difference by referring to the increasing speed determination table; and
changing the control accelerator operation amount to an actual operation amount in the current control cycle with the determined increasing speed.

* * * * *